United States Patent Office 2,967,855
Patented Jan. 10, 1961

2,967,855
COPOLYMERS AND PROCESS FOR PREPARING THE SAME

John L. Lang, Midland, Mich., assignor to The Dow Chemical Company, Midland, Mich., a corporation of Delaware No Drawing. Filed Jan. 30, 1957, Ser. No. 637,062

2 Claims. (Cl. 260—80.5)

This invention relates to improved thermoplastic copolymers and to a process for preparing the same. More particularly it relates to such copolymers having superior physical properties to the heretofore known copolymers of similar empirical composition.

Many organic compounds having olefinic unsaturation have been polymerized to produce polymers finding widespread and deversified utility. Such compounds may be used as the sole polymerizable constituent to produce homopolymers having characteristic properties. With but few exceptions those properties do not satisfy the requirements of the fabricator or the consumer. To alter the properties to satisfy those requirements it has become commonplace to copolymerize two, three, or more monomers having different substituents attached to the terminal carbon atoms of the unsaturation. The substituent groups because of their chemical nature and size appreciably change the properties of the polymer. However, the chemical nature of the substituents also affects the reactivity of the monomers in polymerization, so that when two different monomers are intermixed in about equal amounts and caused to polymerize, the monomer having the greater polymerizability may polymerize with itself to form a homopolymer initially until the concentration of that faster monomer has dropped. The other monomer, which was initially slower, then polymerizes to form a homopolymer. The result is a polymeric mixture consisting of a conglomeration of each homopolymer and various copolymers. The makeup of the conglomeration can vary with initial ratios of monomers, conditions of polymerization, purity of starting materials and many other factors. Reproducibility of the conglomeration from batch to batch is very difficult and it is frequently necessary to blend batches to arrive at the desired properties. Such techniques are costly and time consuming. It would be desirable to have a process capable of producing copolymers having improved properties over the copolymers and mixed polymers of similar composition now produced by conventional procedures.

It is accordingly the principal object of this invention to provide a process for producing certain new copolymers having improved properties over copolymers of similar monomeric composition prepared by prior known processes.

A further object is to provide the new copolymers prepared by such a process.

It has now been discovered that when certain monomers are polymerized by a method hereinafter described the resultant polymers are of high molecular weight, are strong, moldable, and thermoplastic and generally exhibit superior properties over those polymers prepared from the same monomeric ratios by prior known processes.

The monomers useful in the process of this invention fall into three groups. The first group is characterized by the general formula:

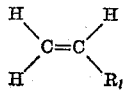

(I)

wherein $R_1$ is an organic functional substituent capable of activating the alpha hydrogen and which is selected from the group consisting of carboxyl, carboxyamide, esterified carboxyl, and aldehyde.

The second group of monomers fall within the scope of the general formula:

(II)

wherein $R_2$ is an organic substituent selected from the group consisting of any of the values of $R_1$, nitrile, phenyl, and alkyl substituted phenyl.

The third group of monomers is characterized by the general formula:

(III)

wherein $R_3$ is selected from the group consisting of hydrogen and methyl, and $R_4$ is selected from the group consisting of hydrogen, halogen, and alkyl.

Thus, the monomers of group I, which have an active hydrogen, are capable in polymerized form of forming crystallites or of orienting into a crystallite-like arrangement through hydrogen bonding, secondary valence forces and the like. The monomers of group III contain a bulky, relatively inert phenyl substituent which in polymerized form tends to oppose the formation of such crystallite-like structures. The monomers of group II may be similar in structure to either those of group I or those of group II.

The process is adaptable for preparing both binary and ternary polymers. In selecting the monomers it is necessary that at least one of the monomers have an active hydrogen like those of group I and that at least one of the monomers have a bulky substituent like those of group III. Thus, in making up a monomeric mixture for preparing binary copolymers, there should be used a monomer from group I with one of the aryl substituted monomers of group II or III. For ternaries a monomer of group I should be mixed with a different monomer of group II and a different monomer of group III.

The proportions of the monomers to be used in this process may be varied within wide limits to produce polymers having characteristic properties dependent upon the particular proportions employed. It has been found that copolymers having noticeably improved properties are produced when the first monomer is present in the homogeneous monomeric material in an amount of from 5 to 50 percent by weight, the second monomer in an amount of from 65 to 10 percent by weight, and the third monomer if present in an amount of up to 30 percent by weight. Although the process may be used in polymerizing the monomers in any proportions to result in copolymers of more uniform architecture, the enhanced properties are particularly noticeable when the monomeric mixture is prepared in the above monomeric concentrations.

The copolymers of this invention are made by heating a homogeneous mixture of the monomeric materials and the copolymeric product thereof in bulk, i.e. in the substantial absence of other polymerizable substances, soluble diluents or insoluble dispersants, or in the presence of small amounts of solvents for the polymer at a pressure sufficient to preserve the liquid state, at a polymerization temperature between about 100° C. and about 155° C. while feeding to the mixture the monomeric materials at a rate and in a proportion such as to maintain in the mixture a constant ratio of the monomeric materials to each other and to maintain the proportion of copolymer in the mixture constant at not more than about 50 percent by weight.

These conditions are readily attained by feeding continuously and at steady rates the monomeric materials to the polymerizing system in a polymerization zone maintained at a temperature of from about 100° C. to about 155° C. while continuously withdrawing from the polymerization zone a portion of the polymerizing system at a rate corresponding to the feed rate of monomeric materials. When equilibrium is attained in such a system, the ratio of monomeric materials to each other in the polymerization zone, the concentration of polymer in the polymerizing system, and the chemical composition of the copolymer product are substantially constant. It should be apparent that the relative proportions in which the monomeric materials are chemically combined in the copolymer are not necessarily the same as the relative proportions of the monomeric materials in the homogeneous mixture from which the copolymer was formed. The proportions of monomeric materials which are necessary in a feed mixture in order to produce a copolymer having a particular empirical structure may be determined from the pertinent reactivity ratios or if such ratios are not available by simple preliminary tests.

It is believed by the inventor that the molecular architecture of the copolymer prepared in accordance with this process is more regular and uniform than that of similar copolymers prepared by the prior methods. The first group and some of the second group of monomers have active hydrogens capable of forming secondary bonds to form a crystallite-like structure. Some of the second group and all of the third group of monomers have bulky groups which in these copolymers tend to separate the polymeric chains. Thus, by reason of the chemical nature of the monomers employed in the process coupled with the regular and uniform molecular architecture resulting from the process a copolymer product is formed having enhanced physical properties. Admittedly the monomeric mixtures employed in this process have been polymerized in bulk before. However, all of those prior processes involved the addition of the total monomeric mixture to a vessel followed by polymerization. Such processes resulted in products having highly irregular, non-uniform, heterogeneous architecture which depended upon the amount of premixing of the monomers and the relative chemical reactivities of the monomers. In the process of this invention, however, it is felt that there are produced copolymers, whose architecture very closely resembles the theoretical recurring groups that could be drawn from an examination of the starting monomeric mixture. The polymer chains may orient themselves at regular intervals so that at periodic points they are held together by hydrogen bonding or other secondary valence forces, or form a crystallite-type structure and at other points are held apart by the bulky groups. Although the above explanation may not be completely accurate, the enhancement of properties has been found to be closely analogous to that enhancement observed when an orientable polymer in an amorphous or supercooled state is oriented.

Because the process operates under equilibrium conditions it is preferred to operate at a conversion of monomer to polymer of about 50 percent or less. When the process is operated at substantially greater conversions than 50 percent, conditions of equilibrium are more difficult to achieve and maintain and the copolymer product is less subject to control. Additionally at higher conversions practical problems, such as uniform heat transfer and pumping of the polymerizing system, become serious. By 50 percent or less conversion is meant that the polymerization mixture contains not more than 50 percent by weight of copolymer product.

Although minor amounts of the usual free radical polymerization catalysts may be employed in the process, they are not necessary for the successful operation of the process. Accordingly, it is preferred to operate without any added catalyst.

The copolymer product can be isolated from the unpolymerized components of the polymerization mixture by any of the known methods, such as by precipitation in a non-solvent. However, it is preferred to devolatilize the mixture mechanically by heating the mixture under reduced pressure whereby the volatile unpolymerized components are vaporized leaving the copolymer product as a residue.

The copolymer products produced in accordance with this process are thermoplastic and capable of being formed by the conventional thermal fabrication methods, such as molding and extrusion, into useful articles. The products exhibit improved properties particularly with regard to tensile strength, elongation, and heat distortion over the products of similar monomer composition but prepared by the prior processes. Because of the improved properties of the products of this invention, the articles prepared therefrom are less liable to failure when subjected to bending, stretching, or twisting forces.

The process of this invention and the copolymer products produced therefrom will be more apparent from the following examples wherein all parts are by weight.

*Example 1*

A polymerization reactor was constructed from a loop of coiled pipe 3 feet long and with an inside diameter of about 0.364 inch. The ends of the pipe were connected to a pump for rapidly circulating the contents of the coil. Means were provided for continuously feeding at a measured uniform rate a homogeneous mixture of liquid monomeric materials. Means were also provided for maintaining the temperature of the coil at a temperature of from 100° C. to about 155° C. At a point in the coil remote from the point of introduction of the feed mixture there was provided means for continuously withdrawing a portion of the polymerization mixture at the same rate as the rate of feed into the coil and under conditions that the contents of the coil are maintained in the liquid state. The withdrawn portion of the polymerization mixture was fed into a devolatilizer where the mixture was heated under reduced pressure and the unpolymerized monomers vaporized leaving the copolymer product as a residue containing approximately 1 percent of volatile material.

Using the above apparatus a homogeneous monomeric mixture consisting of 14.4 percent styrene (III), 41.05 percent ethyl acrylate (I), and 44.55 percent acrylonitrile (II) was fed into the coil at 140° C. Polymerization was allowed to proceed and additional increments of the monomeric mixture added as the polymerization mixture was withdrawn. The process was allowed to come to equilibrium at about 30 percent conversion of monomer to copolymer. The withdrawn polymerization mixture was devolatilized and the ternary copolymer, when molded, was found to have a tensile strength of 8960 pounds per square inch, 42 percent elongation at break, a notched impact strength of 0.5 foot pound per inch of notch, a heat distortion point of 74° C., and a critical elongation of 2.5. The product was a hard rigid material.

When the polymerization was repeated using a monomeric mixture consisting of 40 percent styrene, 40 percent acrylonitrile, and 20 percent ethyl acrylate the polymer had a tensile strength of 10,500 pounds per square inch and a heat distortion temperature of 77° C. and an elongation of 9.0 percent.

When a further polymerization was conducted as above using a monomeric mixture consisting of 40 percent alphamethyl styrene, 40 percent acrylonitrile, and 20 percent ethyl acrylate the resulting polymer had a tensile strength of 10,416 pounds per square inch, a heat distortion temperature of 94° C. and an elongation of 3.9 percent.

By way of contrast when methacrylonitrile was substituted for acrylonitrile in the above process, the copolymer had an elongation at break of only 3 percent.

*Example 2*

Using the apparatus and procedure described in Example 1, a monomeric material consisting of 15 parts of tertiary butyl styrene (III), 10 parts of acrylic acid (I), and 75 parts of styrene (II) were polymerized using alpha - alpha' - azobisisobutyro - nitrile as catalyst. The polymerization was carried out at 80° C. at equilibrium. After devolatilization the polymer was subjected to ASTM test No. D648–45T. In that test a molded test bar is subjected to a pressure of 264 pounds per square inch fiber stress under standardized conditions and the temperature raised gradually until a deformation or deflection of the test bar of 0.01 inch is reached. That temperature is known as the heat distortion temperature. When this polymer was subjected to this test it was found to have a heat distortion temperature of 124° C.

When alpha-methyl styrene is substituted for styrene similar results are observed.

*Example 3*

The process of Example 1 was repeated using a monomeric mixture consisting of 58.3 percent styrene, 35 percent ethyl acrylate, and 6.7 percent acrylic acid. The polymer had a tensile strength of 7,250 pounds per square inch, a heat distortion temperature of 92° C., and an elongation of 2.3 percent.

*Example 4*

Binary copolymers were prepared by the process described in Example 1, from a monomeric mixture consisting of 95 percent styrene and 5 percent acrolein. The copolymers had a tensile strength of 6030 pounds per square inch, a heat distortion temperature of 77° C., and an elongation of 1.6 percent.

When the process was repeated using a monomeric mixture consisting of 65 percent styrene and 35 percent acrolein the resulting copolymer had a tensile strength of 2300 pounds per square inch, a heat distortion temperature of 57° C., and an elongation of 0.35. Both copolymers were insoluble in water, ethanol, and carbon tetrachloride, and were soluble in methyl ethyl ketone, cyclohexane, ethylene dichloride, and tetrahydrofuran.

*Example 5*

To a monomeric mixture consisting of 15 percent styrene, 50 percent acrylonitrile, and 15 percent ethyl acrylate was added 20 percent ethyl benzene as a solvent. The solution was polymerized using the apparatus and procedure described in Example 1. The product, after devolatilization was found to have a tensile strength of 11,610 pounds per square inch, a heat distortion temperature of 83° C., and an elongation of 27.7 percent.

*Example 6*

A comparison of the properties of the products prepared by different polymerization procedures was made.

In the first method, hereinafter identified as Method A, a monomeric material consisting of 41.55 percent ethyl acrylate, 44.25 percent acrylonitrile, and 14.4 percent styrene was introduced into a vessel equipped with an agitator. Polymerization was initiated by introducing 0.05 percent alpha - alpha' - azobisisobutyro - nitrile and warming the material to 50° C. After polymerizing while agitated for 80 minutes the material was devolatilized. The conversion of monomer to polymer was 3.99 percent. The tensile strength and elongation of a molded sample of the polymer were determined.

The second method, hereinafter called Method B, used the process of U.S. Patent 2,769,804, issued November 6, 1956, to Alden W. Hansen. In that method a monomeric material is introduced into a coil type polymerizer and polymerized to a given conversion, the polymer removed and devolatilized, and the monomers obtained from that devolatilization recycled into the polymerizer. The monomeric material introduced consisted of 40 percent ethyl acrylate, 45 percent acrylonitrile, and 15 percent styrene. The polymerization was conducted at 140° C. with 20 percent solids in the coil. After devolatilization and molding into test specimens the tensile strength and elongation were determined.

The third method, hereinafter called method C, employed the process of this invention. The homogeneous monomeric material consisted of 41.55 percent ethyl acrylate, 44.05 percent acrylonitrile, and 14.4 percent styrene. The polymerization was conducted at 140° C. at about 30 percent solids. After devolatilization test specimens were molded and tensile strength and elongations determined. The results are listed in the following table.

|  | Tensile Strength (p.s.i.) | Elongation (percent) |
|---|---|---|
| Method A | 10,800 | 5.7 |
| Method B | 10,860 | 11.4 |
| Method C | 8,960 | 42.0 |

Thus the process of this invention produces a polymer having about the same tensile strength but with vastly increased elongation over the polymers prepared by the prior procedures.

I claim:

1. A process for preparing thermoplastic copolymers comprising the preparation of a homogeneous monomeric material consisting of from 5 to 50 percent by weight of a first monomer having the general formula:

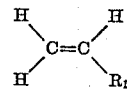

wherein $R_1$ is an organic functional substituent capable of making the hydrogen on the adjacent carbon active and which is selected from the group consisting of carboxyl, carboxyamide, esterified carboxyl, and aldehyde with from 65 to 10 percent by weight of a second monomer different from said first monomer and having the general formula:

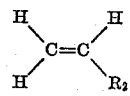

wherein $R_2$ is selected from the group consisting of any of the values of $R_1$, nitrile, phenyl, and alkyl substituted phenyl, and a third monomer in an amount of not more than 30 percent by weight having the general formula:

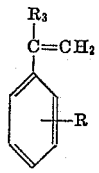

wherein $R_3$ is selected from the group consisting of hydrogen and methyl and $R_4$ is selected from the group consisting of hydrogen, halogen, and alkyl at least 1 of said monomers other than said first monomer containing an aryl substituent attached directly to a terminal carbon of the ethylenic unsaturation, heating a mixture of said homogeneous monomeric material and the copolymer product of polymerization thereof at a polymerization temperature between about 130° C. and about 155° C. at a pressure sufficient to preserve the liquid state the proportion of said copolymer product being not more than about 50 percent by weight of said mixture, maintaining the proportions of said monomeric material and the proportion of said copolymer product in said mixture substantially constant by feeding additional of said mixed monomeric material to the mixture at the rate at which said monomeric material is polymerized while withdrawing said copolymer product at about the same rate at which said monomeric material is being fed to said mixture.

2. The process claimed in claim 1 wherein said second monomer is acrylonitrile, said first monomer is ethyl acrylate, and said third monomer is styrene.

References Cited in the file of this patent

UNITED STATES PATENTS

| | | |
|---|---|---|
| 2,100,900 | Fikentscher et al. | Nov. 30, 1937 |
| 2,537,031 | Chaney | Jan. 9, 1951 |
| 2,576,075 | Naps et al. | Nov. 20, 1951 |
| 2,600,783 | Kropa | June 17, 1952 |
| 2,829,128 | Slocombe et al. | Apr. 1, 1958 |